United States Patent
Yonetani (10) Patent No.: US 9,331,484 B2
(45) Date of Patent: *May 3, 2016

(54) SYSTEMS AND METHODS OF CONTROLLING BATTERY DETERIORATION BY CONTROLLING BATTERY TEMPERATURE DURING POWER EXCHANGE

(71) Applicant: Nissan North America, Inc., Franklin, TN (US)

(72) Inventor: Shinsuke Yonetani, West Bloomfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/198,708

(22) Filed: Mar. 6, 2014

(65) Prior Publication Data
US 2015/0256002 A1 Sep. 10, 2015

(51) Int. Cl.
*H02J 7/04* (2006.01)
*H02J 7/16* (2006.01)
*H02J 3/32* (2006.01)
(Continued)

(52) U.S. Cl.
CPC .............. *H02J 3/32* (2013.01); *H02J 7/0013* (2013.01); *H02J 7/0057* (2013.01); *H02J 7/047* (2013.01); *H02J 13/0006* (2013.01); *H02J 13/0075* (2013.01)

(58) Field of Classification Search
CPC .............. H01M 10/486; H01M 2010/4271; Y02T 90/128; H02J 7/0014; H02J 7/0027; B60L 11/1879; B60L 11/1866; B60L 11/1838; B60L 11/1851; B60L 11/1868; G01R 31/3606; G01R 31/3675
USPC ................. 320/108–109, 119, 134, 136, 150
See application file for complete search history.

(56) References Cited

U.S. PATENT DOCUMENTS

| | | | |
|---|---|---|---|
| 5,773,962 A | 6/1998 | Nor | |
| 7,482,779 B2 * | 1/2009 | Suzuki | B60K 6/445 180/65.285 |
| 7,684,942 B2 | 3/2010 | Yun et al. | |

(Continued)

FOREIGN PATENT DOCUMENTS

| | | |
|---|---|---|
| CA | 2648972 A1 | 6/2009 |
| KR | 20100063343 A | 6/2010 |

(Continued)

*Primary Examiner* — Nghia Doan
(74) *Attorney, Agent, or Firm* — Young Basile Hanlon & MacFarlane P.C.

(57) ABSTRACT

A power exchange controller adjusts a power exchange between a plurality of batteries and an upper authority to control deterioration of a state-of-health of each of the plurality of batteries at an equivalent rate. The power exchange controller is operable to receive a total power demand from the upper authority and each of the plurality of batteries connected to a charging station and adjust the power exchange between the upper authority and each of the plurality of batteries by detecting a battery temperature of each of the plurality of batteries and determining the power exchange with each of the plurality of batteries based on the total power demand and an equalized temperature determined from each battery temperature. Each power exchange is determined so that the battery temperature of each of the plurality of batteries during the power exchange is adjusted to the equalized temperature.

14 Claims, 5 Drawing Sheets

(51) Int. Cl.
  *H02J 7/00*    (2006.01)
  *H02J 13/00*   (2006.01)

(56) References Cited

U.S. PATENT DOCUMENTS

| | | |
|---|---|---|
| 7,714,736 B2 | 5/2010 | Gielniak |
| 8,334,679 B2 | 12/2012 | Owens et al. |
| 8,509,976 B2 | 8/2013 | Kempton |
| 8,643,330 B2 | 2/2014 | Nergaard et al. |
| 2011/0106336 A1 | 5/2011 | Eikeland et al. |
| 2011/0276194 A1* | 11/2011 | Emalfarb ............ B60L 11/1838 700/297 |
| 2012/0029852 A1 | 2/2012 | Goff et al. |
| 2012/0133337 A1 | 5/2012 | Rombouts et al. |
| 2012/0296512 A1 | 11/2012 | Lee et al. |
| 2013/0057209 A1 | 3/2013 | Nergaard et al. |
| 2013/0135110 A1 | 5/2013 | Xie et al. |
| 2013/0138369 A1 | 5/2013 | Papana et al. |
| 2013/0179061 A1 | 7/2013 | Gadh et al. |
| 2015/0035495 A1* | 2/2015 | Yoshida ............ H01M 10/425 320/134 |

FOREIGN PATENT DOCUMENTS

| | | |
|---|---|---|
| WO | 2013041656 A2 | 3/2013 |
| WO | 2013113112 A1 | 8/2013 |

* cited by examiner

SYSTEMS AND METHODS OF CONTROLLING BATTERY DETERIORATION BY CONTROLLING BATTERY TEMPERATURE DURING POWER EXCHANGE

TECHNICAL FIELD

This disclosure relates in general to vehicle charging stations that control vehicle battery deterioration rate using battery temperature during power exchange between the vehicle battery and an upper authority, such as a power grid.

BACKGROUND

The automobile industry has been developing electric vehicles and hybrid electric-internal combustion vehicles (together, referred to as "electric vehicles" or "EVs") in part to reduce emissions of carbon dioxide, thereby reducing air pollution and global warming. The development of rechargeable secondary batteries to drive the EVs is key to making such vehicles practicable. The lifespan of these rechargeable secondary batteries directly affects the performance of the EV, the economics of the EV and the perception of quality of the EV. Therefore, developing batteries that provide optimal performance and lifespan is key to the success of EVs.

SUMMARY

Disclosed herein are systems and methods for controlling battery deterioration. One such system for controlling battery deterioration comprises a power exchange controller operable to adjust a power exchange rate between a plurality of batteries and a power grid to deteriorate a state-of-health of each of the plurality of batteries at an equivalent rate. The power exchange controller is operable to adjust the power exchange by receiving a total power demand from power grid and each of the plurality of batteries connected to a charging station and adjusting the power exchange between the power grid and each of the plurality of batteries by detecting a battery temperature of each of the plurality of batteries and determining the power exchange with each of the plurality of batteries based on the total power demand and an equalized temperature determined from each battery temperature. Each power exchange is determined so that the battery temperature of each of the plurality of batteries during the power exchange is adjusted to the equalized temperature.

Methods are also disclosed for controlling battery deterioration. One method comprises receiving a total power demand from power grid and each of the plurality of batteries connected to a charging station and adjusting a power exchange between the power grid and each of the plurality of batteries by detecting a battery temperature of each of the plurality of batteries and determining the power exchange with each of the plurality of batteries based on the total power demand and an equalized temperature determined from each battery temperature. Each power exchange is determined so that the battery temperature of each of the plurality of batteries during charging is adjusted to the equalized temperature.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
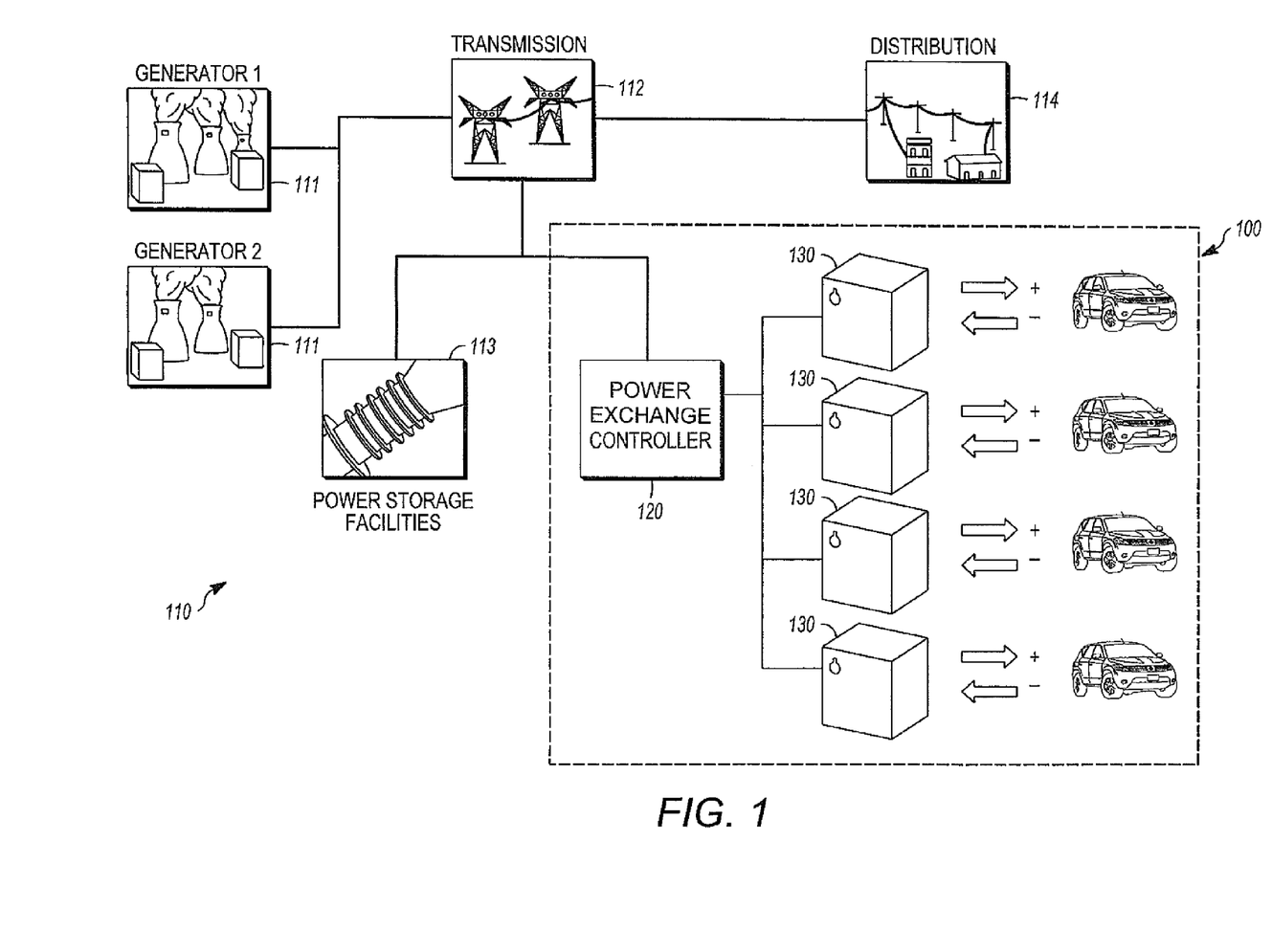
FIG. 1 is an illustration showing a power exchange system implemented in an example power grid.

EVs can be charged and discharged at EV charging stations capable of exchanging power with a number of EVs concurrently. These EV charging stations ultimately pull power from and supply power to the power grid. Power exchange controllers are used to coordinate this supply and return of power from and to the grid by a group of vehicles. FIG. 1 shows a vehicle-to-grid system 100 and an example of an environment in which a battery deterioration control system 100 can be implemented. In the illustrated example, the battery deterioration control system 100 is implemented in the context of a power grid 110. Although the battery deterioration control system 100 can be implemented in the context of a power grid of any type of configuration, a typical power grid can include one or more power generation facilities 111 that generate and supply electrical power, a transmission network 112 that includes long-distance power lines, one or more power storage facilities 113 that receive and store electrical power when supply exceeds demand and return electrical power to the grid 110 when demand exceeds supply, and a distribution network 114 that receives electrical power from the transmission network 112 and distributes electrical power to consumers such as businesses and homes.

The battery deterioration control system 100 includes a power exchange controller 120, which may also be referred to herein as a controller. The power exchange controller 120 is in communication with a plurality of EV charging stations 130. The charging stations 130 need not be at a common geographical location, but rather can be at multiple locations. As an example, at least a first vehicle charging station from the group of charging stations 130 can be at a different geographical location than a second vehicle charging station from the group of charging stations 130. Although referred to as "charging stations," it is understood that a vehicle battery can be charged or discharged through charging stations 130. Essentially, the charging stations 130 are power exchange stations as used herein.

The power exchange controller 120 is operable to receive information from the charging stations 130 and is further operable to send instructions to the charging stations 130. The instructions that are sent from the power exchange controller 120 to the charging stations 130, when interpreted by each charging station 130, are operable to regulate operation of each charging station 130. For example, the instructions sent from the power exchange controller 120 to the charging stations 130 can cause one or more of the charging stations 130 to perform operations such as commencing supply of electrical power to the grid 110, commencing a charging operation, and altering characteristics by which power is supplied to the battery during a charging operation or consumed from the battery during a discharging operation. The power exchange controller 120 can be implemented in the form of a system that includes a processor that is operable to execute instructions that are stored on a computer readable storage device, such as RAM, ROM, a solid state memory device, or a disk drive. The power exchange controller 120 can further include a communications device for exchanging information with other computing devices via a communications network.

Each of the charging stations 130 is connected to the power grid 110 in any suitable manner, is operable to receive electrical power from the power grid 110, and is also operable to supply electrical power to the power grid 110. The charging stations 130 are further in communication with the power exchange controller 120 for sending information to the power exchange controller 120 and receiving information and/or instructions from the power exchange controller 120. As explained with respect to the power exchange controller 120, the charging stations 130 can each include a system that includes a processor that is operable to execute instructions that are stored on a computer readable storage device, which controls operation of each charging station 130. Each of the charging stations 130 can be an on-board charging station that is disposed within the vehicle and forms a part of the vehicle or may be an off-board charging station to which the vehicle is connected by, for example, a charging cable. In both cases, the charging stations 130 are in communication with the power exchange controller 120 by a wired communications link or a wireless communications link, where a wireless communication link is defined where no direct wired communication connection to the charging station 130 is required.

Each of the charging stations 130 can include a power converter that is operable, for example, to convert alternating current electrical power that is received from the grid 110 to direct current electrical power that can be used for charging the batteries of a vehicle that is connected to the charging station 130, as well as to convert direct current electrical power as received from the vehicle into alternating current electrical power that can be returned to the power grid 110. The charging stations 130 are each operable to regulate the process by which power is converted. For example, each of the charging stations 130 can control the wave form of the alternating current power that is supplied to the battery or returned to the power grid 110, such as by modifying the frequency and/or amplitude of the alternating current electrical power.

Figure 2:
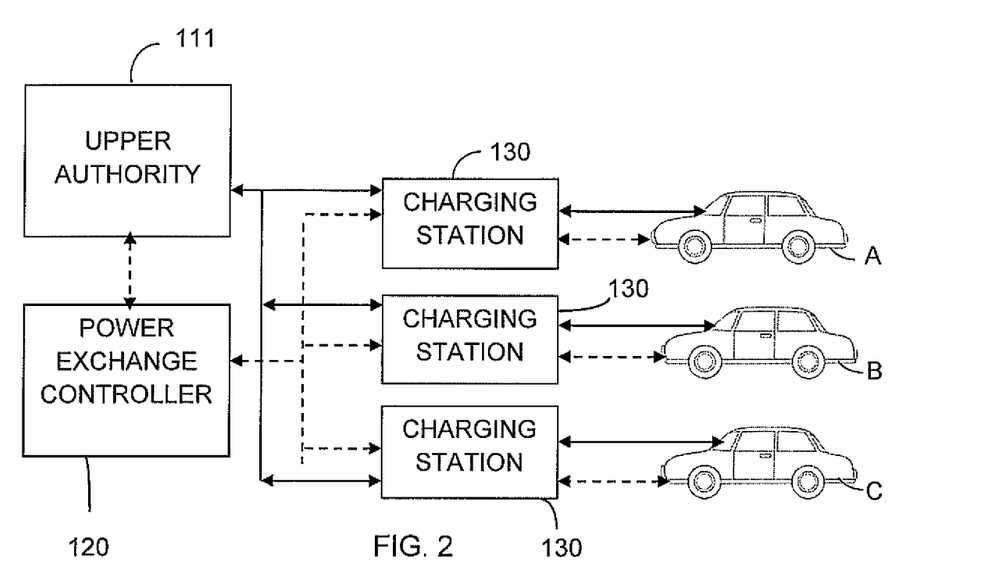
FIG. 2 is a block diagram showing an example of a battery deterioration control system control including coordination between a power exchange controller of the power exchange system.

FIG. 2 is a block diagram showing an example of the battery deterioration control system. The power exchange controller 120 is used to coordinate exchange of power between an upper authority 111 and EV batteries connected to the upper authority 111 through the charging stations 130. The upper authority 111 can include, but is not limited to, the power grid 110 or a building or facility which is provided power via the EV batteries without first being routed to the grid 110. As a non-limiting example of power coordination, the controller 120 may demand power from an EV to decrease a peak energy consumption of an upper authority 111 such as a building if the EV battery has sufficient capacity at a peak consumption time. As another example of coordination, the controller 120 may request power to be exchanged with a connected EV battery to assist with frequency regulation of the power grid 110. As a further example of coordination, the controller 120 may request power to be exchanged from one connected EV battery to another connected EV battery in a vehicle-to-vehicle (V2V) charging operation.

As previously explained, the power exchange controller 120 is in communication with a group of charging stations 130. Although three charging stations 130 are shown in the illustrated example, any number of charging stations 130 can be included in the group of charging stations 130. Each of the charging stations 130 is associated with a respective vehicle, such as a first vehicle having a battery A, a second vehicle having a battery B and a third vehicle having a battery C. The charging stations 130 are each associated with their respective vehicle by an electrical connection, shown by the solid lines, for performing power exchange operations, and the charging stations 130 can be on-board or off-board, as previously explained. The charging stations 130 are all connected to the power grid 110. Communication lines are shown as broken lines.

The batteries of an electric vehicle have a capacity, which represents the maximum amount of power that the battery can store at a given time. Rechargeable batteries have an original capacity when new, and that capacity decreases over time with repeated power exchange cycles. State-of-health is a metric that compares the current capacity of a battery to its original capacity. Each charging station 130 is operable to determine a state-of-health for the battery of the respective vehicle to which it is connected. Each charging station 130 can be operable to determine state-of-health directly, or can be operable to receive state-of-health information from the respective vehicle, as determined by an on-board system of the respective vehicle.

The lifespan of an EV battery depends mainly on the battery's state-of-health which, in turn, depends in part on the temperature of the battery during a power exchange, with a battery's output decreasing as its temperature increases. The temperature of a battery depends on the battery's size, age, internal resistance, state of charge and charge protocol. Temperature, state of charge and charge protocol can depend on how the batteries are used and in what environmental conditions they are used. Because the temperature can be dependent on factors that vary from vehicle to vehicle, such as how the battery is used and the environmental conditions in which it is used, batteries produced at the same facility in the same time period, for example, can each experience performance degradation at varying rates. These varying rates in degradation can have a negative impact on the perceived value, quality and economics of the battery, and in turn, the EV. As temperature of the battery increases during a power exchange operation, the deterioration of the battery increases, i.e. the state-of-health will decrease. The battery deterioration control system and methods herein control battery deterioration by controlling battery temperature during power exchanges during the lifetime of the battery to extend the life of the battery. The systems and methods herein adjust the power fed to or drawn from the battery as the battery ages.

Figure 3A:
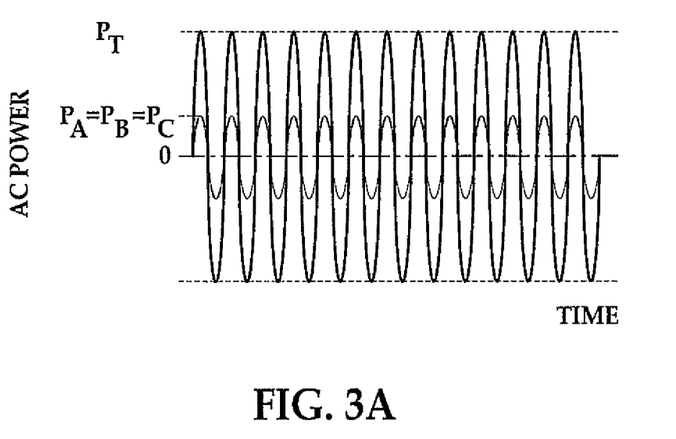
FIG. 3A is a graph of conventional alternating current power distribution.

Referring to FIG. 2, conventionally, EVs connect to the power grid 110 at a charging station 130 as illustrated. The power exchange controller 120 will detect a state-of-charge of each battery A, B, C, detect the power demand of the upper authority 111 and determine the power demand for each battery to be exchanged between each battery and the upper authority 111. The power exchange controller 120 will calculate the power demand $P_A$, $P_B$, $P_C$ of each of the three batteries A, B, C, by dividing the total power demand $P_T$ by the number of EV batteries, being three in this example. As used herein, "power demand" refers to an absolute power and includes both power to be charged to the batteries and power to be drawn from the batteries depending on which is required at a point in time during a battery's connection. FIG. 3A illustrates the total alternating current power demand $P_T$ having a frequency and amplitude, with the amplitude being divided equally to the three EV batteries, so that $P_A=P_B=P_C$. The frequency may fluctuate to maintain the voltage and/or the current frequency of the upper authority 111, and is shown constant in FIGS. 3A and 3B by means of example only. For instance, the upper authority may select and dynamically change the characteristics (e.g. current, voltage, power, frequency) the total power demand $P_T$ to maintain a power grid frequency of power grid, or reduce a peak power consumption of a building.

Simply dividing the power to be exchanged equally between batteries A, B, C will have a different impact on the state-of-health of each battery because the batteries A, B, C can have different internal resistances. Assuming for the sake of example that batteries A, B, C are each at a state-of-health of 100%, but battery A has an internal resistance of 0.12 ohm while batteries B, C each have an internal resistance of 0.1 ohm. If batteries A, B, C exchange equal power, i.e., equal frequency and amplitude, the higher internal resistance of battery A will cause a higher temperature rise in battery A during power exchange than the temperature rise of batteries B, C, as illustrated by the broken lines in FIG. 4. Because of the increase in internal temperature of battery A during power exchange due to its higher internal resistance, battery A's state-of-health will degrade more rapidly than the state-of-health of batteries B, C, as illustrated by the broken lines in FIG. 5.

The systems and methods herein control battery deterioration using the power exchange controller 120 that is operable to adjust power exchanges of a plurality of EV batteries to cause a state-of-health of each of the plurality of EV batteries to decrease over time at an equivalent rate.

Figure 6:
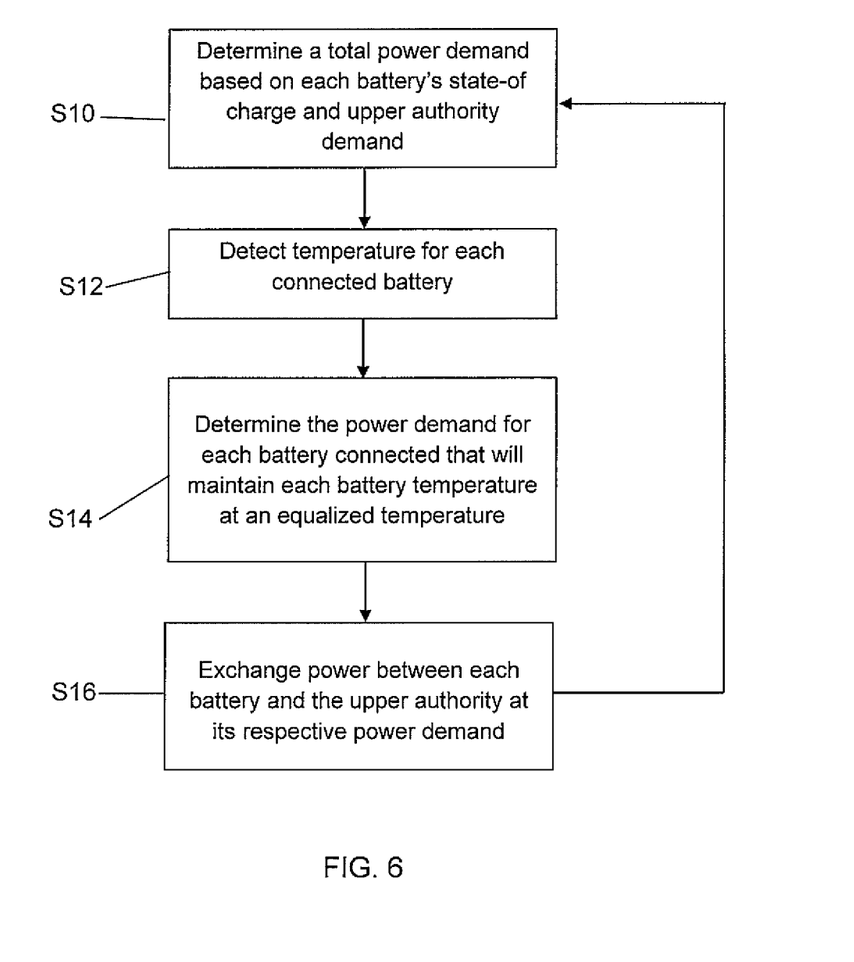
FIG. 6 is a flow diagram of a method of battery deterioration control as disclosed herein.

A method for controlling battery deterioration is shown in FIG. 6. In step S10, when one or more EVs connect to one or more charging stations 130, the power exchange controller 120 determines a total power demand of the system from the power demand of the upper authority 111 and from each of the connected batteries' state-of-charge. The total power demand can also be based on user inputs that might alter an individual battery's demand. For example, if a user requires a full charge at a specific time, the power exchange controller 120 must adjust the power demand for that battery, and in turn, the total power demand, to provide that battery with the requisite power at the requisite time.

In step S12, a battery temperature is detected for each connected EV battery. The power exchange controller 120 detects or receives the battery temperature for each of the batteries A, B, C, from the respective one of the charging stations 130 that is associated with each of the EVs or from the EV itself.

Figure 3B:
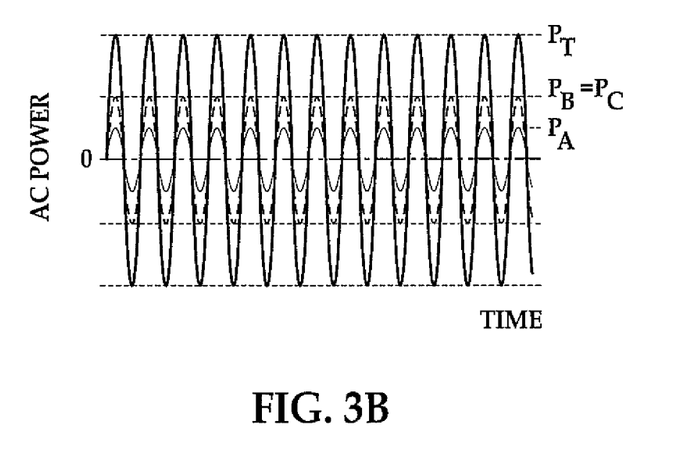
FIG. 3B is a graph of alternating current power distribution based on the systems and methods disclosed herein.

In step S14, a power demand for each of the connected EV batteries is determined based on the total power demand and an equalized temperature determined from each battery temperature. The power demand $P_A$, $P_B$, $P_C$ for each of the connected batteries together will be equal to the total power demand $P_T$. As illustrated in FIG. 3B, the total power demand $P_T$ for all of the connected EV batteries is maintained by adjusting an amplitude of the power exchange by each of the connected batteries A, B, C. Either the amplitude of alternating current power or direct current power can be adjusted.

Figure 4:
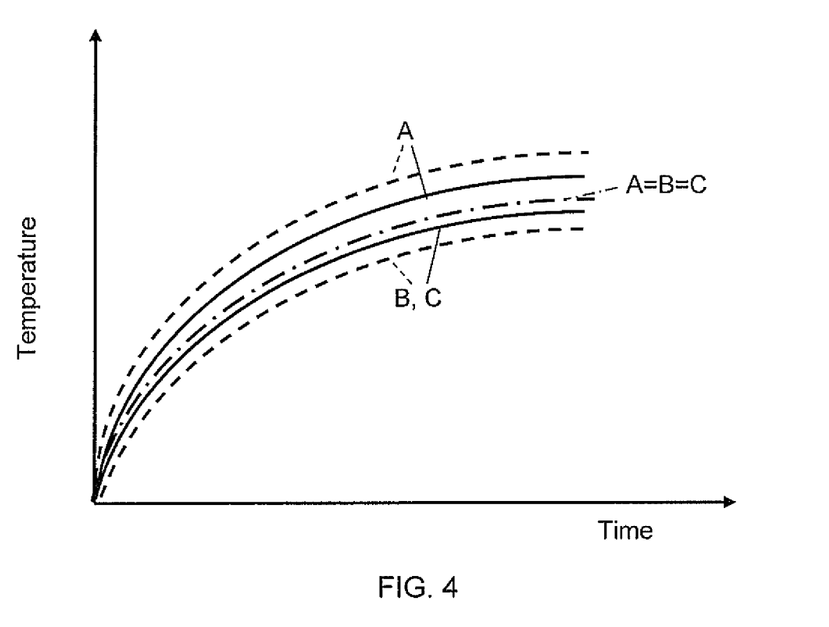
FIG. 4 is a graph of battery internal temperature over time illustrating the change in battery internal temperature and an equalized temperature based on the systems and methods disclosed herein.

Each battery power demand is calculated so that the battery temperature of each of the plurality of batteries during power exchange is adjusted to the equalized temperature, while maintaining the total power exchange equal to the total power demand. FIG. 4 illustrates the equalized temperature shown in chain line. The power demand for each of battery A, B, C is calculated in step S14 so that the temperature of each of batteries A, B, C during a power exchange follows the equalized temperature line.

The calculated power demand for each connected battery is exchanged between each respective battery and the upper authority 111 in step S16. Temperature detection and the calculation of power demand for each battery are dynamic for each battery throughout the battery connection period to the charging station 130. The system repeats steps S10 through S16, dynamically changing the power demand for each battery to maintain the equalized temperature. The method ends for a particular battery when that battery is disconnected, and the method can continue for the remaining connected batteries.

Referring back to FIG. 4, the temperature difference between battery A and batteries B, C is shown with the broken lines, while the chain line shows the equivalent temperature. The solid lines illustrate the temperature of the batteries A, B, C as the batteries A, B, C are adjusted toward the equivalent temperature. The solid lines represent the actual temperature of each of batteries A, B, C as power is exchanged using the battery deterioration control system and method. The solid lines are provided by means of example only. The lines may more closely follow the equalized temperature line and may not be smooth, better reflecting the recurring loop of the method. As illustrated in FIG. 4, the calculated power demand to battery A having a battery temperature above the equalized temperature is a lower power demand, as shown in FIG. 3B. Batteries B, C receive an increase in power demand because they each have a battery temperature lower than the equalized temperature.

Figure 5:
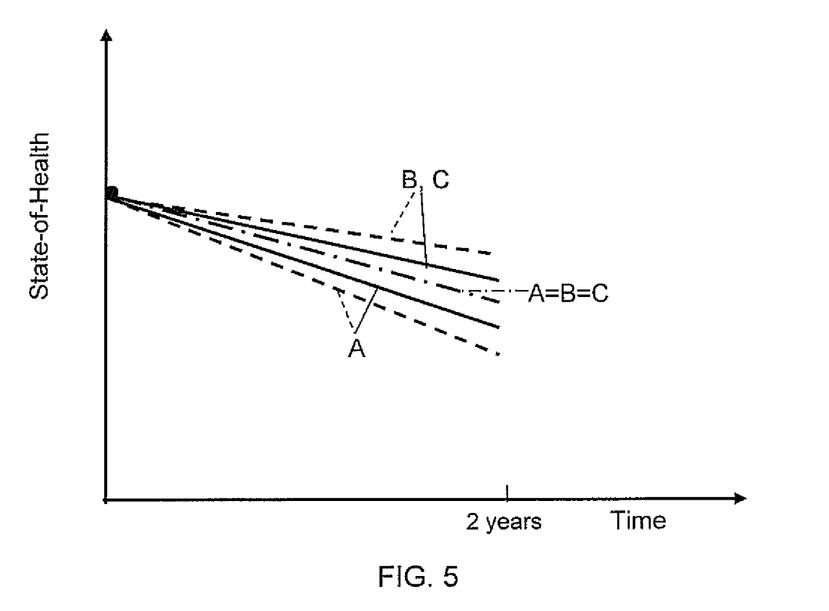
FIG. 5 is a graph of battery state-of-health over time illustrating the change in battery state-of-health and an equalized state-of-health based on the systems and methods disclosed herein.

FIG. 5 illustrates the effect that the adjusted internal temperature has on each battery's state-of-health. A two year time period is used by means of illustration only. As shown, the equalized state-of-health, shown with chain line, would be realized if the internal temperatures of each of batteries A, B, C were maintained at the equalized temperature throughout the power exchange. The solid lines in FIG. 5 represent the actual state-of-health of each of batteries A, B, C based on the actual temperatures realized in FIG. 4. The state-of-health of battery A improves over the two year time period due to power being exchanged at a lower power, decreasing battery A's internal temperature during power exchanges over the two year time period. The state-of-health of batteries B, C deteriorates at a faster rate over the two year time period due to a higher power exchange rate, increasing the internal temperature during power exchange over the two year time period for each of battery B, C. The systems and methods herein will lengthen the lifetime of the battery by taking advantage of the battery's health when it is young and compensating for the battery's health when it has aged.

The methods herein can be implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. The methods can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein. In the claims, the term "processor" should be understood as including any the foregoing, either singly or in combination. Herein, the terms "program" and "process" should be understood to run on the processor.

Further, all or a portion of embodiments described herein can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The methods disclosed may incorporate user input for one or more variables. The processor used for these methods can include a user interface, a display, a key pad, a touch screen and any other devices that are known to those skilled in the art to assist in the interface between processor and user.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A battery deterioration control system comprising:
   charging stations for vehicles operable to exchange power between batteries connected to the charging stations and a power grid, the charging stations or power grid having a power exchange controller operable to control the exchange of power between the batteries of the vehicles and the power grid, the power exchange controller programmed to:
   receive from the charging stations a battery temperature of each of a plurality of batteries connected to the charging stations;
   receive a total power demand from the power grid and each of the plurality of batteries connected to a charging station; and
   determine a power exchange with each of the plurality of batteries based on the total power demand and an equalized temperature determined from each battery temperature, wherein the power exchange for each of a plurality of batteries is determined so that the battery temperature of each of the plurality of batteries during the power exchange is adjusted to the equalized temperature.

2. The battery deterioration control system of claim 1, wherein the power exchange controller is operable to maintain the power exchange with all of the plurality of batteries equal to the total power demand.

3. The battery deterioration control system of claim 2, wherein the power exchange controller is operable to maintain the total power demand to all of the plurality of batteries by adjusting an amplitude of power of the power exchange to at least a portion of the plurality of batteries.

4. The battery deterioration control system of claim 1, wherein the power exchange controller is further operable to adjust the power exchange with each of the plurality of batteries by decreasing the power exchange with each of the plurality of batteries having a battery temperature above the equalized temperature and increasing the power exchange with each of the plurality of batteries having a battery temperature lower than the equalized temperature.

5. The battery deterioration control system of claim 1, wherein each battery has a connection period and the power exchange controller is operable to dynamically repeat receiving and adjusting steps throughout at least a portion of the connection period.

6. The battery deterioration control system of claim 1, wherein each vehicle having one of the plurality of batteries includes an on-board charging system in communication with the power exchange controller.

7. The battery deterioration control system of claim 6, wherein the on-board charging system of each vehicle is in communication with the power exchange controller via at least one of a wired communications link or a wireless communications link.

8. The battery deterioration control system of claim 1, wherein each vehicle having one of the plurality of batteries is connected to a respective off-board vehicle charging station that is in communication with the power exchange controller.

9. The battery deterioration control system of claim 8, wherein the respective off-board vehicle charging station for each vehicle is in communication with the power exchange controller via at least one of a wired communications link or a wireless communications link.

10. A method for controlling battery deterioration of a vehicle comprising:
    receiving a total power demand from an upper authority and each of a plurality of batteries connected to a charging station; and
    adjusting the power exchange between the upper authority and each of the plurality of batteries with a controller in communication with the charging station by:
      receiving a battery temperature of each of the plurality of batteries from a telematics unit of a respective vehicle; and
      determining a power exchange with each of the plurality of batteries based on the total power demand and an equalized temperature determined from each battery temperature, wherein each power exchange is determined so that the battery temperature of each of the plurality of batteries during the power exchange is adjusted to the equalized temperature.

11. The method of claim 10, wherein determining the power exchange with each of the plurality of batteries comprises maintaining a total power exchange with all of the plurality of batteries equal to the total power demand.

12. The method of claim 11, wherein maintaining the total power exchange with all of the plurality of batteries comprises adjusting an amplitude of power of the power exchange to at least a portion of the plurality of batteries.

13. The method of claim 10, wherein adjusting the power exchange with each of the plurality of batteries comprises decreasing the power exchange with each of the plurality of batteries having a battery temperature above the equalized temperature and increasing the power exchange with each of the plurality of batteries having a battery temperature lower than the equalized temperature.

14. The method of claim 10, wherein each battery has a connection period and the method is dynamically repeated throughout at least a portion of the connection period.

* * * * *